United States Patent
Washizawa et al.

(10) Patent No.: US 7,319,943 B2
(45) Date of Patent: Jan. 15, 2008

(54) OPTIMUM DESIGN METHOD, AND APPARATUS, AND PROGRAM FOR THE SAME

(75) Inventors: Teruyoshi Washizawa, Kanagawa (JP); Akira Asai, Kanagawa (JP); Masayoshi Tachihara, Tokyo (JP); Katsuhiko Sinjo, Tokyo (JP); Nobuhiro Yoshikawa, Asaka (JP)

(73) Assignee: Canon Kabushiki Kaisha, Tokyo (JP)

( * ) Notice: Subject to any disclaimer, the term of this patent is extended or adjusted under 35 U.S.C. 154(b) by 763 days.

(21) Appl. No.: 10/735,143

(22) Filed: Dec. 11, 2003

(65) Prior Publication Data

US 2004/0143798 A1    Jul. 22, 2004

(30) Foreign Application Priority Data

Dec. 16, 2002   (JP)   ............. 2002-363916
Dec. 16, 2002   (JP)   ............. 2002-363917
Dec. 16, 2002   (JP)   ............. 2002-363918

(51) Int. Cl.
*G06F 17/50* (2006.01)
*G06F 9/00* (2006.01)

(52) U.S. Cl. .............. 703/2; 703/6; 700/28; 700/38; 706/25; 708/422

(58) Field of Classification Search .............. 703/2, 703/6, 1; 700/38, 47, 28; 708/488, 800
See application file for complete search history.

(56) References Cited

U.S. PATENT DOCUMENTS 4,982,438 A  *  1/1991  Usami et al. ............... 382/154
5,195,026 A  *  3/1993  Nonaka et al. ............... 700/47

(Continued)

FOREIGN PATENT DOCUMENTS

JP        2001-134628 A       5/2001

OTHER PUBLICATIONS

Bulman, et al., "Comparisons between algorithms for structural topology optimization using a series of benchmark studies", Computers and Structures, 79, pp. 1203-1218, 2001.

(Continued)

*Primary Examiner*—Thai Phan
(74) *Attorney, Agent, or Firm*—Canon U.S.A. Inc. I.P. Division

(57) ABSTRACT

In an optimum design method comprising a first solution determining step of solving an optimization problem of a first evaluation function for a state variable vector with a design variable vector being as a parameter, and a second solution determining step of solving an optimization problem of a second evaluation function for the design variable vector and the state variable vector thus obtained, the second solution determining step includes the steps of computing a gradient vector of the second evaluation function for the design variable vector, computing a first coefficient based on a value of a norm of the gradient vector, computing a search vector based on the first coefficient, computing a second coefficient, and updating the design variable vector based on the second coefficient. The second coefficient computing step includes the first solution determining step, the first solution determining step is executed as an iterative method based on the gradient vector, and the state variable vector is not initialized during iteration. The optimum design method is precisely adaptable for structural changes.

13 Claims, 14 Drawing Sheets

U.S. PATENT DOCUMENTS

| | | | |
|---|---|---|---|
| 5,295,228 A | * | 3/1994 | Koda et al. .................... 706/25 |
| 5,513,098 A | * | 4/1996 | Spall et al. .................... 700/38 |
| 6,148,274 A | * | 11/2000 | Watanabe et al. .............. 703/6 |
| 2002/0057838 A1 | * | 5/2002 | Steger ........................ 382/197 |
| 2002/0183987 A1 | * | 12/2002 | Chiang .......................... 703/2 |

OTHER PUBLICATIONS

Hsu, et al., "Interpreting results from topology optimization using density contours", Computers and Structures, 79, pp. 1049-1058, 2001.

English translation and description for figures of Hiroshi Yamakawa, "Saitekika Dezain (Optimized Design)", Computation Mechanics and CAE Series 9, Baifukan Co., Ltd., 1993.

4. English translation of Fujii, Suzuki and Otsubo, "Topology Optimization of Structures Using Voxel Finite Element Method", Transactions of JSCES, Paper No. 200000010, 2000.

* cited by examiner

OPTIMUM DESIGN METHOD, AND APPARATUS, AND PROGRAM FOR THE SAME

BACKGROUND OF THE INVENTION

1. Field of the Invention

The present invention relates to a solution of an optimization problem of design parameters, and more particularly to an automatic design technique for optimization of shapes including topology of structural members.

2. Description of the Related Art

The term "structural topology optimum design" means a problem for deciding the topology and shape dimensions of a structural member, which are optimum under given conditions. Hereinafter, the topology and shape dimensions of a structural member will be referred to as "design argument functions", and the above decision problem will be referred to as a "design-variable-function optimization problem". The reason why the term "argument functions" is used resides in that the topology and shape dimensions are given as functions of a three-dimensional space.

In the design-variable-function optimization problem, an optimization problem of a state argument function must be solved for a value of each design argument function. From this point of view, the structural topology optimum design can be regarded as a double structure optimization problem that contains an optimization problem of a state argument function on the inner side and an optimization problem of a design argument function on the outer side. As to the optimization problem of a state argument function on the inner side, the concept of dividing a space into a finite number of elements is employed based on accumulation of known techniques.

For a problem taking strain energy of a structural member as an evaluation generic function, in particular, a finite element method is generally employed as a solution technique for that problem. A direct method with respect to a linear equation is employed for solution of the finite element method.

On the other hand, regarding the optimization problem of a design argument function, the following three kinds of methods have been primarily provided (see Reference 1, S. Bulman, J. Sienz, E. Hinton: "Comparisons between algorithms for structural topology optimization using a series of benchmark studies", Computers and Structures, 79, pp.1203-1218 (2001), or Reference 2, Y-L. Hsu, M-S. Hsu, C-T. Chen: "Interpreting results from topology optimization using density contours", Computers and Structures, 79, pp.1049-1058 (2001)):

1. Evolutionary method (referred to as "E method" below)
2. Homogenization method (referred to as "H method" below)
3. Material distribution method (referred to as "MD method" below)

According to the E method, each of partial spaces resulting from dividing a space is called a cell, and creation and disappearance of cells are repeated in accordance with proper rules. A structural member is given as a set of cells that exist finally. A definite structural member is obtained by allowing only two states represented by whether the cell exists or not. Also, because the E method does not employ differential information of the evaluation generic function and can avoid trapping to a local optimum solution, the E method is effective in the case of the evaluation generic function having multiple peaks.

Reference 3 (Japanese Patent Laid-Open No. 2001-134628) proposes an optimization design device for a skeleton structural member, which employs one kind of the E method, i.e., a genetic search method. The proposed optimization design device comprises an approximate optimization computing device using approximation formulae for discrete design variable data such as section dimensions of a skeleton structural member, and a close optimization computing device using the design variable data. Those two computing devices are combined with each other to be adapted for an actual design problem containing a large number of design variables.

The H method enables sensitivity analysis to be employed by assuming a finer structure for a structural element positioned in each of divided partial spaces and introducing a new design argument function having a continuous value. Here, the term "sensitivity analysis" means an analytical technique utilizing differential information of the evaluation generic function with respect to the design argument function. If the sensitivity analysis is enabled, it becomes possible to employ an iterative method, such as a gradient method. As a result, a computation time required for search of at least a local optimum solution can be greatly cut in comparison with a round-robin technique, such as the E method. (See Reference 4, Hiroshi Yamakawa, "*Saitekika Dezain* (Optimization Design)", Computation Dynamics and CAE Series 9, Baifukan Co., Ltd. (1996).)

The MD method is a method for expressing changes in topology and shape dimensions of a structural member by assigning, to each element, a real number in the range of 0 to 1 representing the presence probability of the structural member. The MD method is similar to the H method in that the sensitivity analysis is enabled by replacing discrete information, which indicates whether the structural member is present or not, with a continuous value representing the presence probability of the structural member. However, because the number of parameters is smaller in the MD method than in the H method, the MD method is advantageous in that modeling is easier and the application range is wider.

Reference 5, Fujii, Suzuki and Otsubo, "Structure Phase Optimization Using Voxel Finite Element Method", Transactions of JSCES, Paper No. 200000010(2000), describes a phase optimization technique for a structure based on the MD method. This technique has features given below.

(1) Because of using a voxel finite element method (in which a space is divided at equal intervals), element rigidity matrices for all elements are the same. Accordingly, by computing the element rigidity matrix once in advance, it is available in subsequent computations. Furthermore, since elements are regularly arranged, there is no need of storing node number information for each element.

(2) A pre-processed conjugate gradient method and an element-by-element method are combined with each other to solve large-scaled simultaneous linear equations. As a result, a solution can be obtained without setting up an entire rigidity matrix, and therefore the memory capacity required for processing can be reduced.

(3) A homogenization method requires 6 design variables (in the three-dimensional case) for one element. Further, each time the design variable is changed, the element rigidity matrix must be computed again. On the other hand, by employing a density method expressing the presence probability of the structural member as a density ratio, only one design variable is required for one element. In addition, changes of the design variable do not affect the element rigidity matrix.

The above-mentioned known techniques, however, have problems given below.

Generally, a structure optimization problem is formulated as a double optimization problem containing an optimization problem of a state variable vector per iterative step for an optimization problem of a design variable vector. Assuming the optimization problem of a state variable vector to be optimization on the outer side and the optimization problem of a design variable vector to be optimization on the inner side, the optimization on the inner side is a problem of determining the state variable vector with the design variable vector being a parameter, i.e., the design variable vector being fixed. This problem is usually called structural analysis and can be solved based on the finite element method by using the solution technique for a linear equation.

However, if a structure changes and a structural member does not exist in a certain area any more, for example, if a structural member is holed, the design variable of the corresponding element becomes 0 and the Young's modulus of that element also eventually becomes 0. This leads to a result that the problem cannot be solved by the direct method because a coefficient matrix of the linear equation is not fully filled with elements and an inverse matrix does not exist.

For that reason, most of the known techniques employ a method of using a value of not exactly 0, i.e., replacing 0 with a small value close to 0, when the design variable vector becomes 0. This method is similarly applied to the voxel finite element method employed in Reference 5.

Setting the design variable of the element to a small value, however, corresponds to the case in which there exists a thin film or a weak member from a physical point of view. Stated another way, an area where no materials are present is not exactly expressed in the known techniques.

Further, as seen from the figure showing the result in Reference 5, a structural element area not contributing to total strain energy, i.e., a floating island area or a projection area, is left in the result. Such a structural element area should be finally removed, but a method for removing that area is not explained in Reference 5.

In FIG. 16, by way of example, when elements 512, 513 and 514 are neither subjected to any weight nor supported, those elements have no contributions from the standpoint of strength. In other words, those elements are ones not contributing to total strain energy and hence should be removed in accordance with a design demand for minimum total weight of the structural members. However, it is difficult to find those elements so long as the solution technique is based only on simple geometrical information, i.e., on connection of characteristic functions.

SUMMARY OF THE INVENTION

It is an object of the present invention to provide an optimum design method capable of executing structure optimum design, including topology, without utilizing the experiential rules that depend on individual problems.

Another object of the present invention is to provide an optimum design method capable of eliminating a component corresponding to a structural element that does to contribute to an evaluation function, when a variable for optimizing a value of the evaluation function is determined.

According to one aspect, the present invention which achieves those objects relates to an optimum design method comprising a first solution determining unit of solving an optimization problem of a first evaluation function for a state variable vector with a design variable vector being as a parameter; and a second solution determining unit of solving an optimization problem of a second evaluation function for the design variable vector and the state variable vector obtained in the first solution determining unit, wherein the second solution determining unit includes a gradient vector computing unit of computing a gradient vector of the second evaluation function for the design variable vector; a first coefficient computing unit of computing a first coefficient based on a value of a norm of the gradient vector; a search vector computing unit of computing a search vector based on the first coefficient; a second coefficient computing unit of computing a second coefficient; and a design variable vector updating unit of updating the design variable vector based on the second coefficient, the second coefficient computing unit including the first solution determining unit, the first solution determining unit being executed as an iterative method based on the gradient vector, and the state variable vector being not initialized during iteration.

According to one aspect, the present invention which achieves those objects relates to an optimum design apparatus comprising first solution determining means for solving an optimization problem of a first evaluation function for a state variable vector with a design variable vector being as a parameter; and second solution determining means for solving an optimization problem of a second evaluation function for the design variable vector and the state variable vector obtained in the first solution determining means, wherein the second solution determining means includes gradient vector computing means for computing a gradient vector of the second evaluation function for the design variable vector; first coefficient computing means for computing a first coefficient based on a value of a norm of the gradient vector; search vector computing means for computing a search vector based on the first coefficient; second coefficient computing means for computing a second coefficient; and design variable vector updating means for updating the design variable vector based on the second coefficient, the second coefficient computing means including the first solution determining means, the first solution determining means being executed as an iterative method based on the gradient vector, and the state variable vector being not initialized during iteration.

According to still another aspect, the present invention which achieves those objects relates to a computer-readable optimum design program, the program comprising codes for causing a computer to perform an optimum design method comprising a first solution determining step of solving an optimization problem of a first evaluation function for a state variable vector with a design variable vector being as a parameter; and a second solution determining step of solving an optimization problem of a second evaluation function for the design variable vector and the state variable vector obtained in the first solution determining step, wherein the second solution determining step includes a gradient vector computing step of computing a gradient vector of the second evaluation function for the design variable vector; a first coefficient computing step of computing a first coefficient based on a value of a norm of the gradient vector; a search vector computing step of computing a search vector based on the first coefficient; a second coefficient computing step of computing a second coefficient; and a design variable vector updating step of updating the design variable vector based on the second coefficient, the second coefficient computing step including the first solution determining step, the first solution determining step being executed as an iterative method based on the gradient vector, and the state variable vector being not initialized during iteration.

According to yet another aspect, the present invention which achieves those objects relates to an optimum design method comprising a first solution determining step of solving an optimization problem of a first evaluation function for a state variable vector with a design variable vector being as a parameter; and a second solution determining step of solving an optimization problem of a second evaluation function for the design variable vector and the state variable vector obtained in the first solution determining step, wherein the second solution determining step includes a design variable vector updating step of updating the design variable vector in sequence, the design variable vector updating step including a minimum point searching step of making search from a start point to obtain a minimum point; and a terminal point evaluating step of deciding an optimum point based on a value of the second evaluation function at the minimum point and a value of the second evaluation function at an end point.

According to another aspect, the present invention which achieves those objects relates to an optimum design apparatus comprising first solution determining means for solving an optimization problem of a first evaluation function for a state variable vector with a design variable vector being as a parameter; and second solution determining means for solving an optimization problem of a second evaluation function for the design variable vector and the state variable vector obtained in the first solution determining means, wherein the second solution determining means includes design variable vector updating means for updating the design variable vector in sequence, the design variable vector updating means including minimum point searching means for making search from a start point to obtain a minimum point; and terminal point evaluating means for deciding an optimum point based on a value of the second evaluation function at the minimum point and a value of the second evaluation function at an end point.

According to a further aspect, the present invention which achieves those objects relates to a computer-readable optimum design program, the program comprising codes for causing a computer to perform an optimum design method comprising a first solution determining step of solving an optimization problem of a first evaluation function for a state variable vector with a design variable vector being as a parameter; and a second solution determining step of solving an optimization problem of a second evaluation function for the design variable vector and the state variable vector obtained in the first solution determining step, wherein the second solution determining step includes a design variable vector updating step of updating the design variable vector in sequence, the design variable vector updating step including a minimum point searching step of making search from a start point to obtain a minimum point; and a terminal point evaluating step of deciding an optimum point based on a value of the second evaluation function at the minimum point and a value of the second evaluation function at an end point.

According to a further aspect, the present invention which achieves those objects relates to an optimum design method comprising a first solution determining step of solving an optimization problem of a first evaluation function for a state variable vector with a design variable vector being as a parameter; a second solution determining step of solving an optimization problem of a second evaluation function for the design variable vector and the state variable vector obtained in the first solution determining step; and an erasing step of erasing, from the design variable vector, a component corresponding to a structural element that does not contributes to the second evaluation function.

According to a further aspect, the present invention which achieves those objects relates to an optimum design apparatus comprising first solution determining means for solving an optimization problem of a first evaluation function for a state variable vector with a design variable vector being as a parameter; second solution determining means for solving an optimization problem of a second evaluation function for the design variable vector and the state variable vector obtained in the first solution determining means; and erasing means for erasing, from the design variable vector, a component corresponding to a structural element that does not contributes to the second evaluation function.

According to a further aspect, the present invention which achieves these objects relates to a computer-readable optimum design program, the program comprising codes for causing a computer to perform an optimum design method comprising a first solution determining step of solving an optimization problem of a first evaluation function for a state variable vector with a design variable vector being as a parameter; a second solution determining step of solving an optimization problem of a second evaluation function for the design variable vector and the state variable vector obtained in the first solution determining step; and an erasing step of erasing, from the design variable vector, a component corresponding to a structural element that does not contributes to the second evaluation function.

Other objectives and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

DESCRIPTION OF THE PREFERRED EMBODIMENTS

A preferable one embodiment according to the present invention will be described in detail below with reference to the accompanying drawings.

First Embodiment

Figure 2:
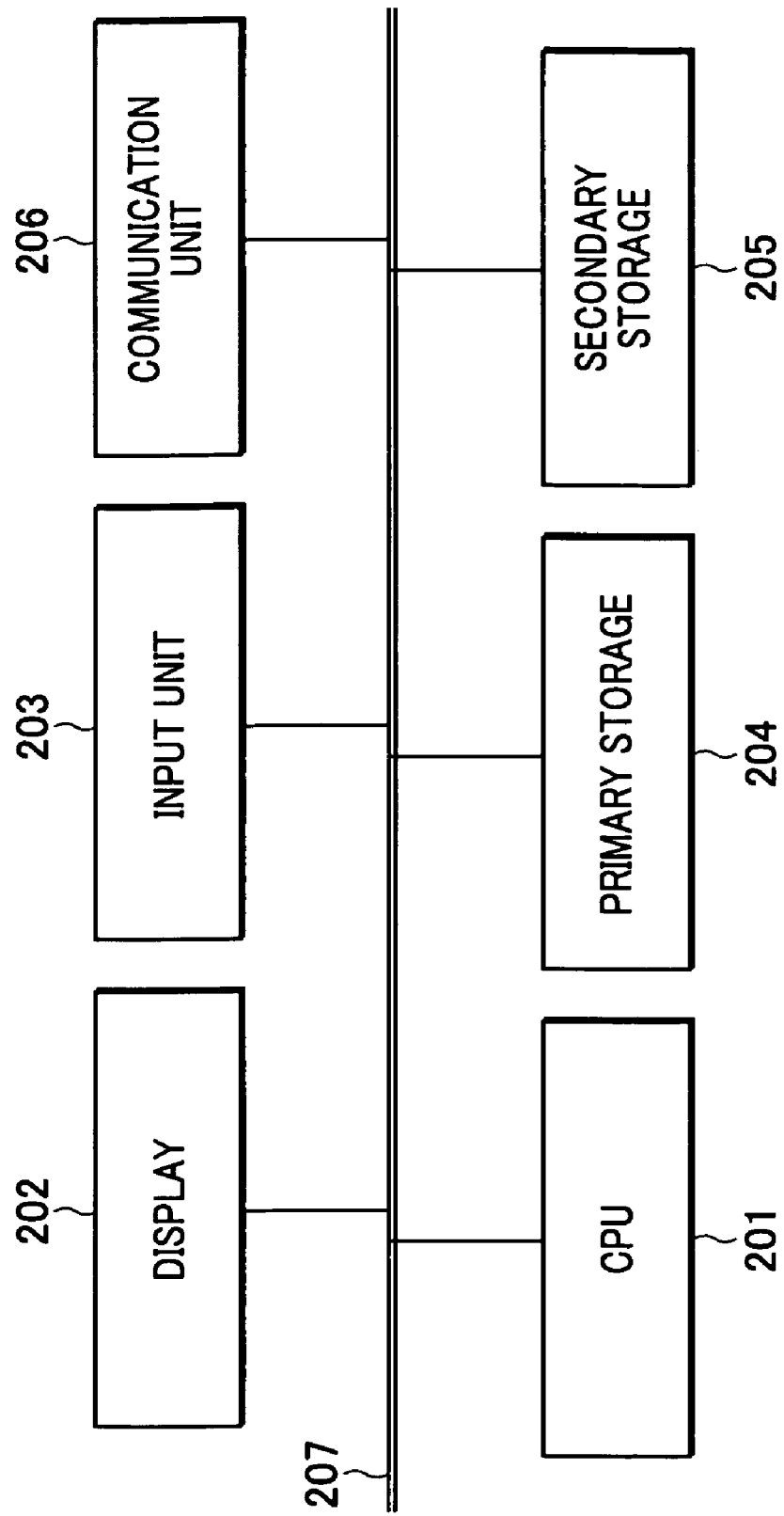
FIG. 2 is a block diagram of an apparatus according to one embodiment.

FIG. 2 shows the configuration of an apparatus according to one embodiment. As shown in FIG. 2, the apparatus comprises a CPU 201, a display 202, an input unit 203, a primary storage 204, a secondary storage 205, a communication unit 206, and a bus line 207.

Various processing functions executed in this embodiment is stored as programs in the secondary storage 205 beforehand. Any of the stored programs is loaded into the primary storage 204 and then executed in response to a command input via the input unit 203 or the communication unit 206.

For the sake of explanation given below, a target problem is formulated as follows.

Assuming that an argument function is expressed by a finite dimension vector with formulation based on the finite element method, an evaluation generic function for an argument function is given as an evaluation function for a variable vector. The following description is made on an assumption that the argument function is expressed by a finite dimension vector.

A state variable vector x and a design variable vector f are written as column vectors, respectively, as given below;

$$x = (x_1, x_2, \ldots, x_m)^T \quad \text{(Eq. 1)}$$

$$f = (f_1, f_2, \ldots, f_n)^T \quad \text{(Eq. 2)}$$

wherein T represents transposition, x represents an m-dimension vector, and f represents an n-dimension vector.

Boundary conditions of x and f are assumed to be $B_1$ and $B_2$, respectively, as follows:

$$B_1(x) = 0 \quad \text{(Eq. 3)}$$

$$B_2(f) = 0 \quad \text{(Eq. 4)}$$

Evaluation functions for the state variable vector x and the design variable vector f are assumed to be $L_1$ and $L_2$, respectively, as follows;

$$L_1 = L_1(x;f) \quad \text{(Eq. 5)}$$

$$L_2 = L_2(f,x) \quad \text{(Eq. 6)}$$

wherein $L_1$ is a function with x being a variable vector and f being a parameter, and $L_2$ is a function with x and f being both variable vectors.

In a general optimization problem, a number $K_1$ of equality restraint conditions and a number $K_2$ of inequality restraint conditions are applied in many cases. Therefore, the j-th equality restraint condition and the k-th inequality restraint condition for the design variable are assumed to be $Q_j$ and $R_k$, respectively, as follows:

$$Q_j(f,x) = 0 \quad \text{(Eq. 7)}$$

$$R_k(f,x) \geq 0 \quad \text{(Eq. 8)}$$

From the definition described above, the optimum design problem is given as a problem of determining a solution, which satisfies the following equation, under the restraint conditions (Eq. 4), (Eq. 5), (Eq. 6), (Eq. 7) and (Eq. 8):

$$\min[L_2] \quad \text{(Eq. 9)}$$

Additionally, the state variable x is obtained as a solution satisfying the following equation under the restraint condition (Eq. 3):

$$\min[L_1] \quad \text{(Eq. 10)}$$

Processing executed in this embodiment will be described below on the basis of the above formulation.

For simplicity of the explanation, it is assumed in the following description that the equality restraint conditions of (Eq. 7) is given by one condition as follows;

$$Q(f) = \sum_{j=1}^{j=n} c_j f_t(j) + c_0 = 0 \quad \text{(Eq. 11)}$$

wherein $c_j$ (j=0, 1, . . . , n) is a constant.

Also, the inequality restraint conditions of (Eq. 8) are assumed to be given as the following ranges of value;

$$R_j^-(f) = f_t(j) - f_{jmin} \geq 0$$

$$R_j^+(f) = f_{jmax} - f_t(j) \geq 0 \quad \text{(Eq. 12)}$$

wherein j=1, 2, . . . , n.

Accordingly, the number of the inequality restraint conditions is twice the number of the design variables.

Flag vectors $a^+$ and $a^-$ having the same dimensions as those of the design variable vector are defined as follows:

$a^+ = 0$, if $0 \geq R_j^+(f)$
$a^+ = 1$, otherwise and $a^- = 0$, if $0 \geq R_j^-(f)$
$a^- = 1$, otherwise Also, it is assumed that a set of j, at which $a^+$ and $a^-$ are each 1, is $\Lambda_1$ and a set of other indices is $\Lambda_2$.

Figure 1:
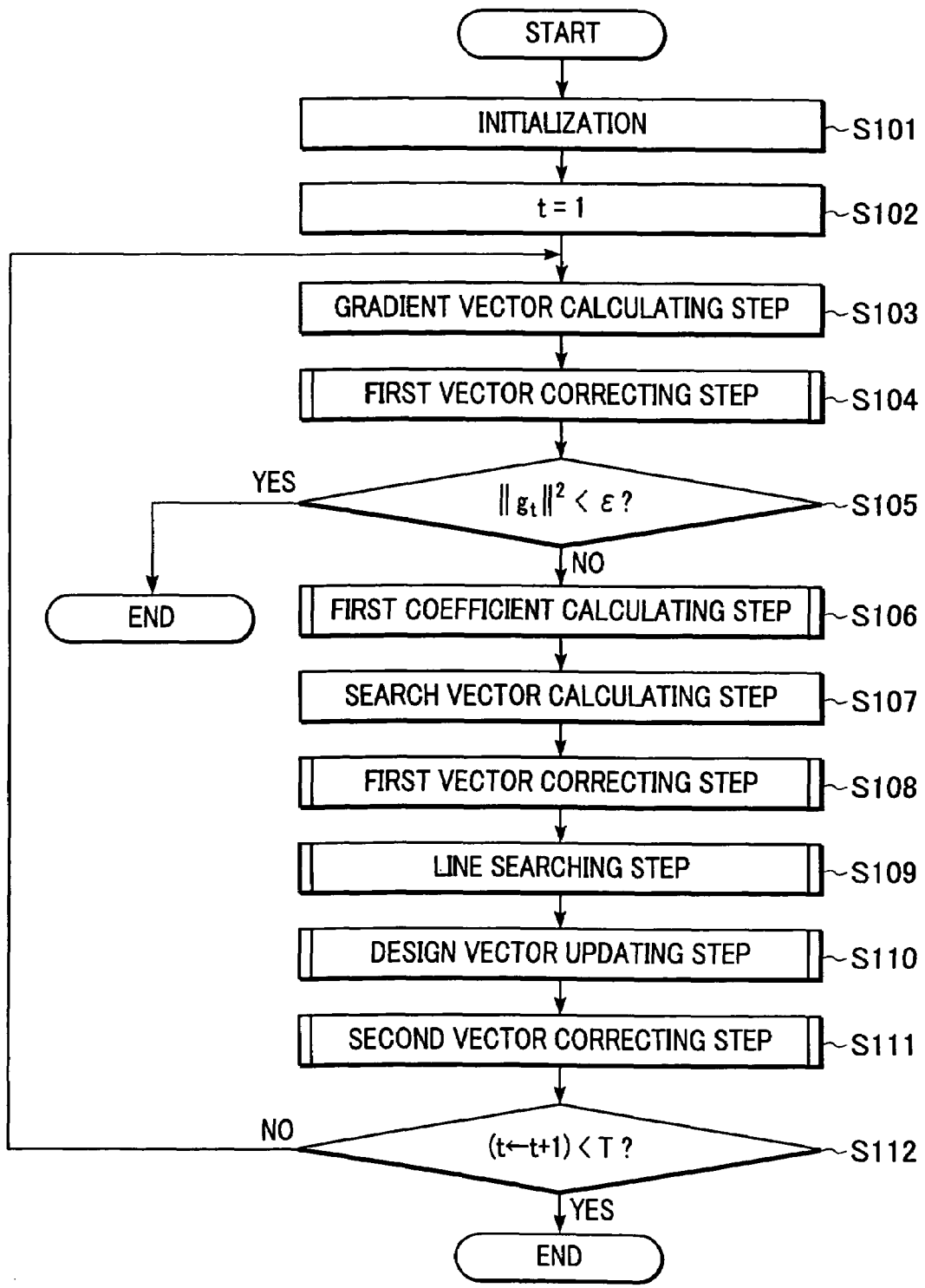
FIG. 1 is a flowchart showing a processing sequence of a second solution determining step.

FIG. 1 is a flowchart showing a processing sequence of a second solution determining step. Referring to FIG. 1, in step S101, the CPU reads various factors of a system to be simulated. The various factors may be read as data entered from the input unit 203 or the communication unit 206, or may be given by reading data that has been stored as a file in the secondary storage 205 beforehand. The various factors of the system include initial values of x and f, the boundary conditions $B_1$, $B_2$, the evaluation functions $L_1$, $L_2$, and the restraint conditions $Q_j$, $R_k$. Based on such information of the various factors, the program secures a required variable area in the primary storage 204 and sets values.

In step S102, the number of times t of iterations is initialized to 1. The number of times t of iterations means the number of times at which a first iteration process has been executed in the second solution determining step. The second solution determining step is brought to an end if the number of times of iterations of the processing from step S103 to step S111 reaches a setting value T.

A gradient vector computing step is executed in step S103. In the gradient vector computing step, the CPU computes a gradient vector $g_t$ of a second evaluation function for the design variable vector. The gradient vector $g_t$ is computed in accordance with the following equation:

$$g_t = (\partial L_2/\partial f_1, \partial L_2/\partial f_2, \ldots, \partial L_2/\partial f_n)^T \quad \text{(Eq. 13)}$$

Whether $\partial L_2/\partial f_j$ can be analytically solved or not depends on cases. If an analytical solution is present, (Eq. 10) is obtained by utilizing a computing process for the analytical solution. If otherwise, the gradient vector can be computed by utilizing the technique called automatic differentiation. The automatic differentiation technique is known from, for example, Reference 6 (Koichi Kubota and Masao Iri, "*Arugorizumu no Jidobibun to Oyou* ("Automatic Differentiation and Applications of Algorithm", Modern Nonlinear Science Series, Corona Publishing Co., Ltd., (1998)).

In step S104, a first vector correcting step is executed for $g_t$ obtained from (Eq. 13). The first vector correcting step will be described later with reference to FIG. 6.

A convergence determining step is executed in step S105. In this step, the square of a norm of $g_t$ is computed, and if the computed value becomes 0 or smaller than a very small value $\epsilon$ close to 0, the processing is brought to an end. The square of the norm is computed in accordance with the following equation;

$$\|g_t\|^2 = g_t^T g_t \quad \text{(Eq. 14)}$$

A first coefficient computing step is executed in step S106. In the first coefficient computing step, a coefficient $\beta$ is computed in accordance with (Eq. 15) given below:

$$\beta = \|g_t\|^2 / \|g_{t-1}\|^2 \quad \text{(Eq. 15)}$$

wherein $\beta = 1$ holds at $t=1$.

A search vector computing step is executed in step S107. In this step, a search vector $p_t$ at the t-th iteration is computed in accordance with (Eq. 16) given below:

$$p_t = -g_{t-1} + \beta p_{t-1} \quad \text{(Eq. 16)}$$

In step S108, a first vector correcting step is executed for $p_t$ obtained from (Eq. 16). This step will be described later with reference to FIG. 6.

A line searching step is executed in step S109. In this step, a coefficient $\delta$ for updating the design variable is decided. This step will be described later with reference to FIG. 3.

A design variable vector updating step is executed in step S110. In this step, the design variable vector is updated as follows:

$$f_{t+1} = f_t + \delta p_t \quad \text{(Eq. 17)}$$

In step S111, a second vector correcting step is executed for the design variable vector. This step will be described later with reference to FIG. 7.

In step S112, t is updated to t+1, and if t after the update exceeds the preset number of times of iterations, the processing is brought to an end.

The foregoing is the flow of the second solution determining step. Individual processing steps in this step will be described in more detail below.

Figure 3:
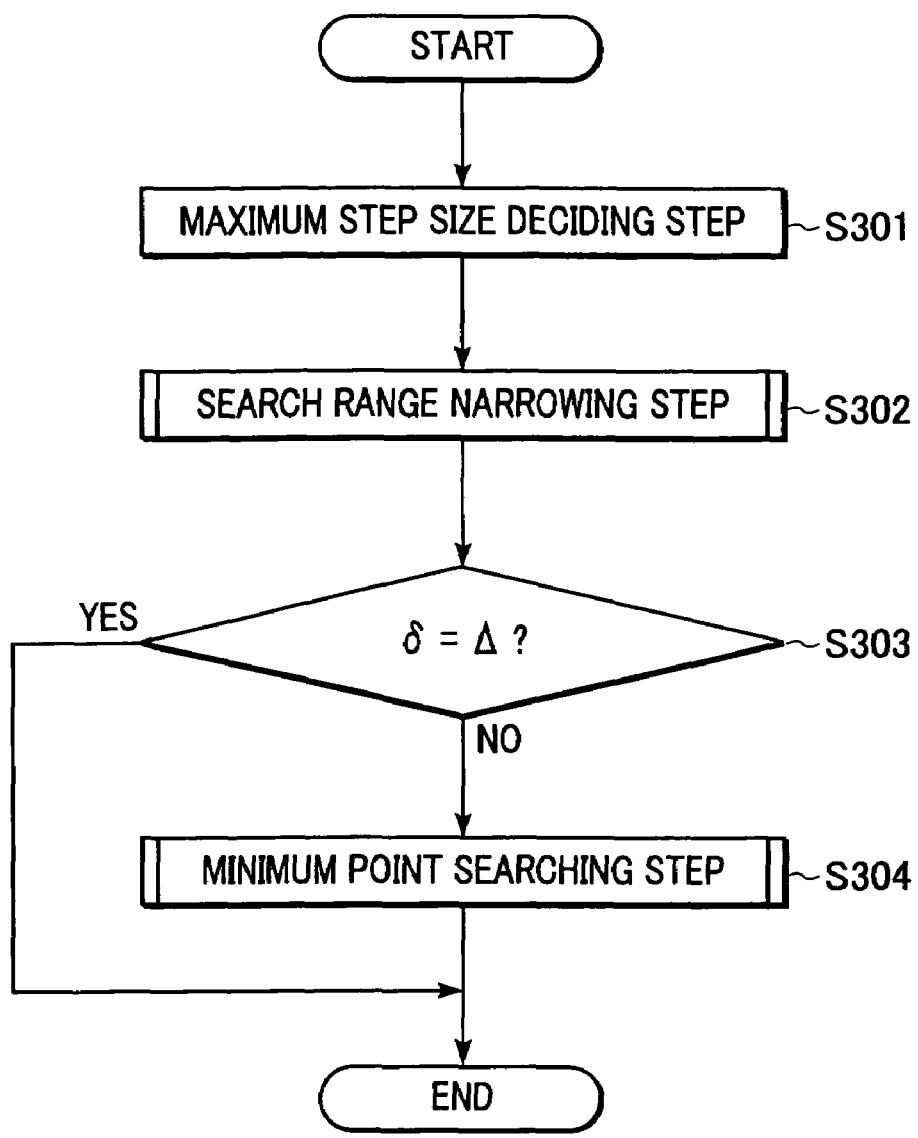
FIG. 3 is a flowchart showing a processing sequence of a line searching step.

The line searching step will be described below with reference to FIG. 3. In this step, the current design variable value $f_t$ and the search vector $p_t$ at the current design variable value are given as arguments. It is also assumed that the evaluation function and the restraint condition are given as appropriate.

In step S301, a maximum step size $\Delta$ is computed using the following equation;

$$\Delta = \underset{j \in \Lambda_1}{\text{MIN}}[(f\!f(j) - f_t(j))/p_t(j)] \text{ wherein} \quad \text{(Eq. 18)}$$

$$f\!f(j) = f_{j\max}, \text{ if } p_t(j) > 0$$

$$= f_{j\min}, \text{ if } p_t(j) < 0$$

Further, various variables are initialized as follows;

$$g1 = (3.0 - 5.0^{1/2})/2$$

$$g2 = (5.0^{1/2} - 1)/2$$

$$d\Delta = \Delta/T_m$$

$$a1 = 0.0$$

$$a2 = a1 + d\Delta \quad \text{(Eq. 19)}$$

wherein $T_m$ is a positive integer used for dividing the search range into appropriate zones and is set to a value in the range of, e.g., 10 to 100.

In step S302, a search range narrowing step is executed. This step will be described later with reference to FIG. 4.

In step S303, $\delta$ set in the search range narrowing step is compared with the maximum step size $\Delta$. If they are equal to each other, the processing is brought to an end. If otherwise, the CPU proceeds to step S304.

In step S304, a minimum point searching step is executed. This step will be described later with reference to FIG. 5. The line searching step is thereby brought an end.

Figure 4:
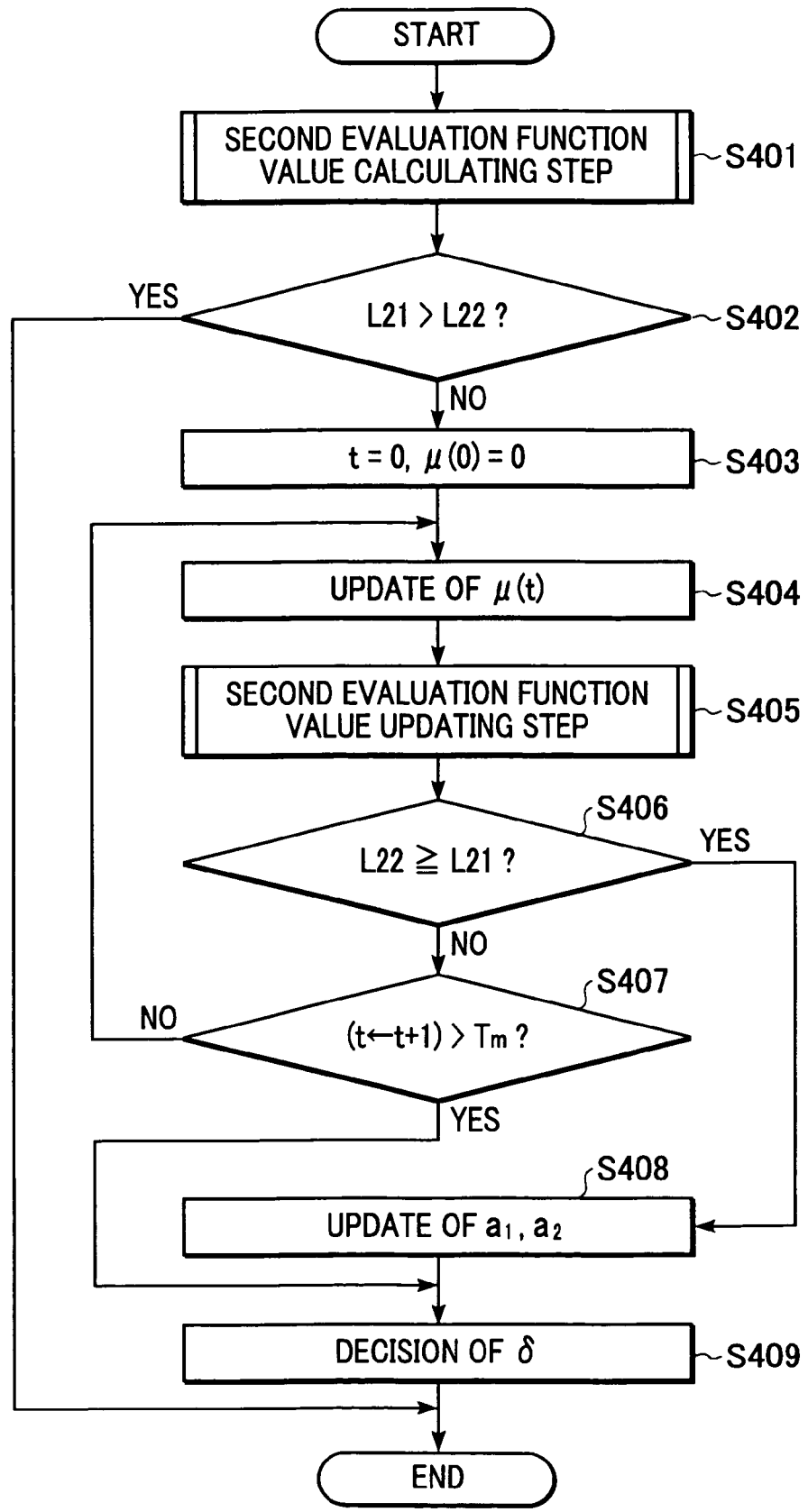
FIG. 4 is a flowchart showing a processing sequence of a search range narrowing step.

The search range narrowing step will be described below with reference to FIG. 4.

Figure 10:
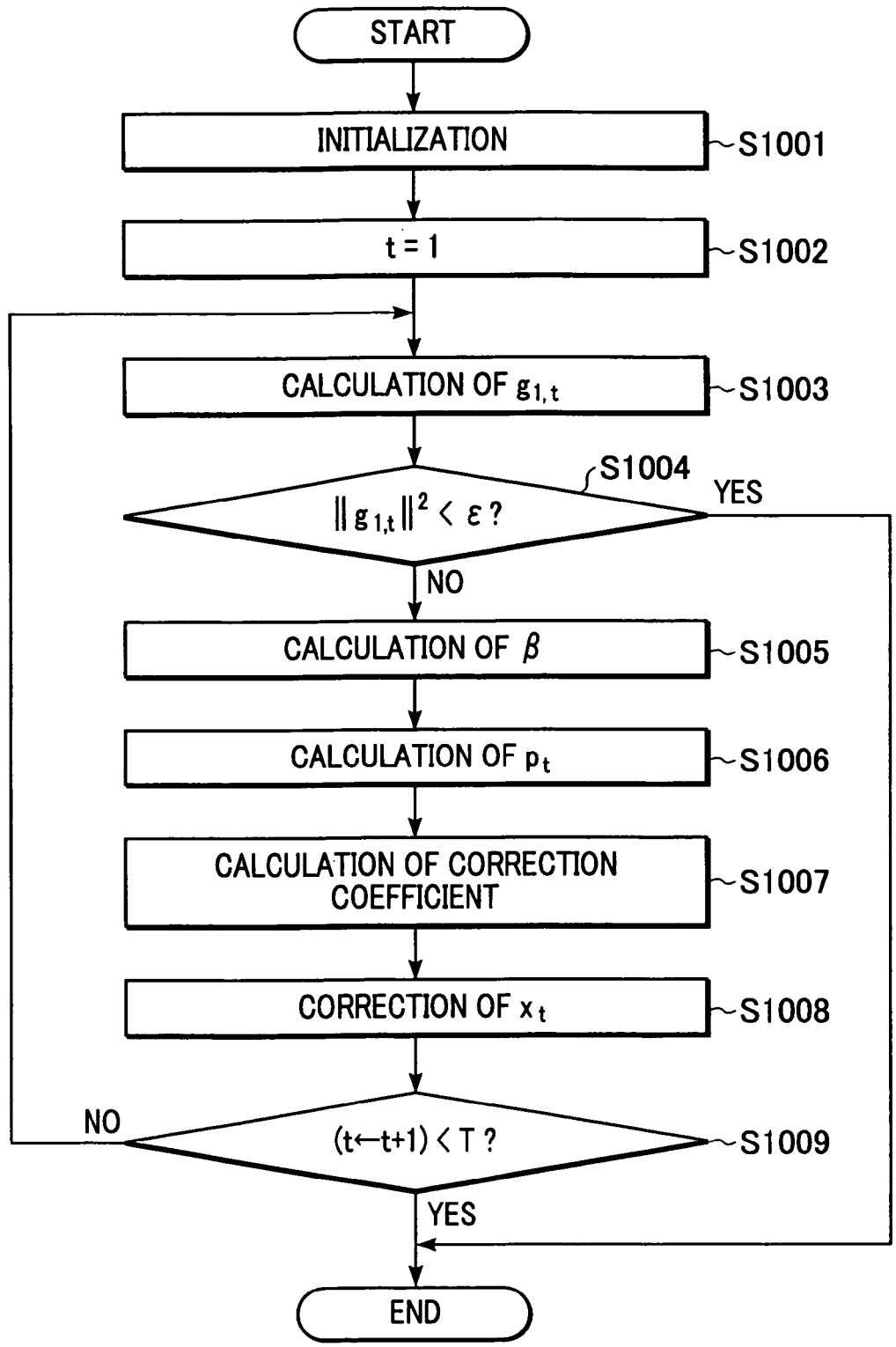
FIG. 10 is a flowchart showing a processing sequence of a first solution determining step.

In step S401, values of the second evaluation functions are computed as follows;

$$L21 = L2(x(f_t + a1 p_t), f_t + a1 p_t) \quad \text{(Eq. 20)}$$

$$L22 = L2(x(f_t + a2 p_t), f_t + a2 p_t) \quad \text{(Eq. 21)}$$

wherein $x(f_t + a1 p_t)$ and $x(f_t + a2 p_t)$ are obtained by executing a first solution determining step that will be described later with reference to FIG. 10.

In step S402, L21 and L22 are compared with each other. If L21 is larger than L22, the processing is brought to an end. If otherwise, the CPU proceeds to step S403.

In step S403, t is initialized to 0 and μ(t) is initialized to 0.

In step S404, μ(t) is updated as follows:

$$\mu(t) = \mu(t-1) + d\Delta \quad \text{(Eq. 22)}$$

In step S405, L21 and L22 are updated as follows;

$$L21 = L22 \quad \text{(Eq. 23)}$$

$$L22 = L_2(x(f_x + \mu(t)p_t), f_x + \mu(t)p_t) \quad \text{(Eq. 24)}$$

wherein $x(f_x + \mu(t)p_t)$ is obtained by executing the first solution determining step that will be described later with reference to FIG. 12.

In step S406, L21 and L22 are compared with each other. If L21 is not larger than L22, the CPU proceeds to step S408, and if otherwise, it proceeds to step S407.

In step S407, t is updated to t+1, and thereafter t is compared with $T_m$. If t is larger than $T_m$, the CPU proceeds to step S409, and if otherwise, it proceeds to step S404.

In step S408, computations of the following equations are executed:

$$a1 = \mu(t) - 2d\Delta$$

$$a2 = \mu(t) \quad \text{(Eq. 25)}$$

In step S409, $\mu(t)$ and $\Delta$ are compared with each other. If $\mu(t)$ is larger than $\Delta$, $\Delta$ is substituted for $\delta$. If otherwise, an arbitrary value other than $\Delta$ is substituted for $\delta$, whereby the search range narrowing step is brought to an end.

Figure 5:
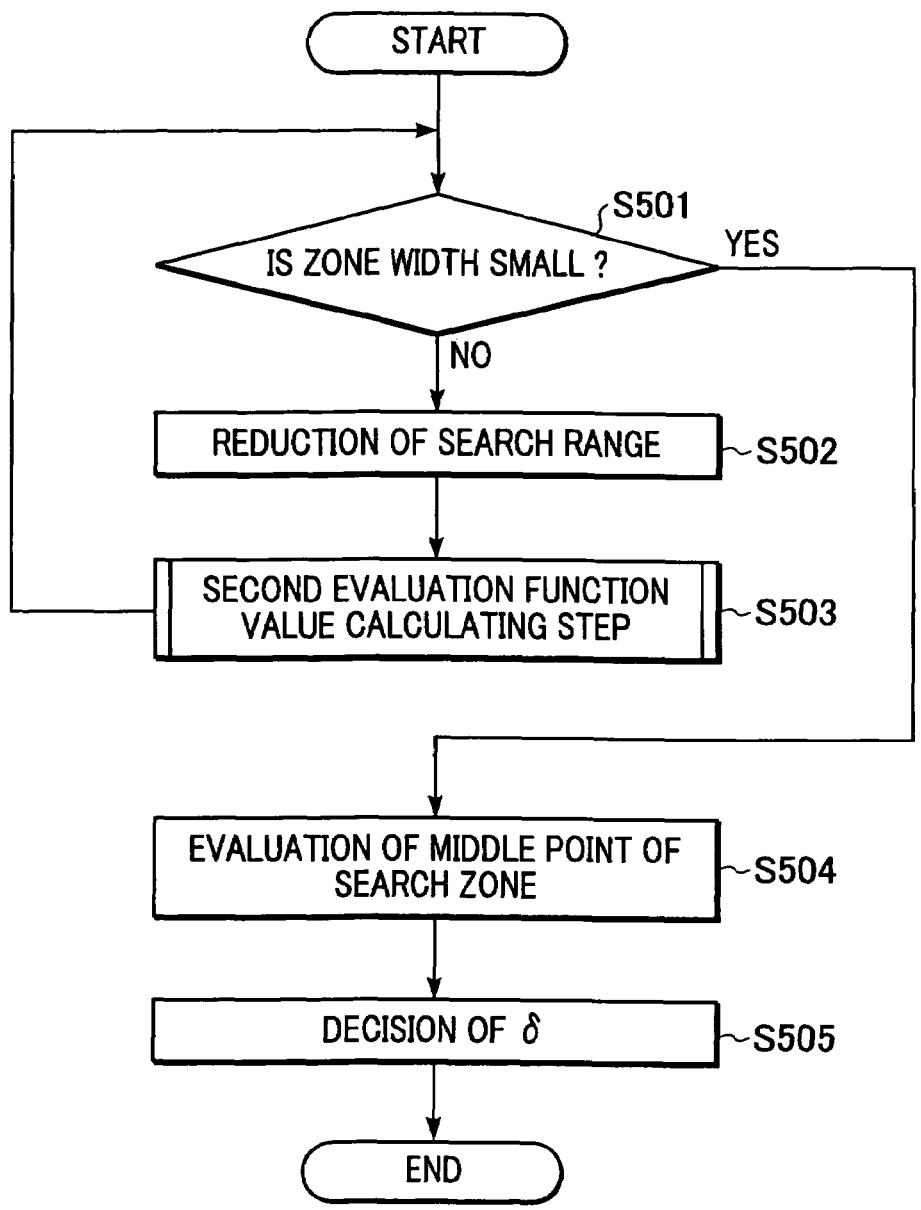
FIG. 5 is a flowchart showing a processing sequence of a minimum point searching step.

The minimum point searching step will be described below with reference to FIG. 5.

In step S501, a computation of the following equation is executed:

$$da = a2 - a1 \quad \text{(Eq. 26)}$$

If da is not larger than a preset small positive real number, the CPU proceeds to step S504, and if otherwise, it proceeds to step S502.

In step S502, computations of the following equations are executed:

$$v1 = a1 + g1 \, da$$

$$v2 = a1 + g2 \, da \quad \text{(Eq. 27)}$$

Further, the search range is narrowed as follows:

$$a2 = v2, \text{ if } L21 < L22$$

$$a1 = v1, \text{ otherwise} \quad \text{(Eq. 28)}$$

This narrowing is a range reduction based on the golden section method.

In step S503, values of the second evaluation function are computed based on the following equations, and the CPU proceeds to step S501;

$$L21 = L2(x(f_x + a1p_t), f_x + a1p_t)$$

$$L22 = L2(x(f_x + a2p_t), f_x + a2p_t) \quad \text{(Eq. 29)}$$

wherein $x(f_x + a1p_t)$ and $x(f_x + a2p_t)$ are obtained by executing the first solution determining step that will be described later with reference to FIG. 10.

In step S504, a middle point ac of the search zone and a value L2c of the second evaluation function at the middle point are computed as follows:

$$ac = (a1 + a2)/2 \quad \text{(Eq. 30)}$$

$$L2c = L2(x(f_x + ac \, p_t), f_x + ac \, p_t) \quad \text{(Eq. 31)}$$

In step S505, a value of $\delta$ is decided as follows:

$$\begin{aligned}\delta &= ac, & \text{if } L2c = \text{MIN}[L21, L22, L2c, L2e] \\ &= a1, & \text{else if } L21 = \text{MIN}[L21, L22, L2c, L2e] \\ &= a2, & \text{else if } L22 = \text{MIN}[L21, L22, L2c, L2e] \\ &= \Delta, & \text{else if } L2e = \text{MIN}[L21, L22, L2c, L2e] \\ &= 0, & \text{otherwise}\end{aligned} \quad \text{(Eq. 32)}$$

In (Eq. 32), MIN[ ] is a function of returning a minimum value among the arguments. The minimum point searching step is thereby brought to an end.

Figure 6:
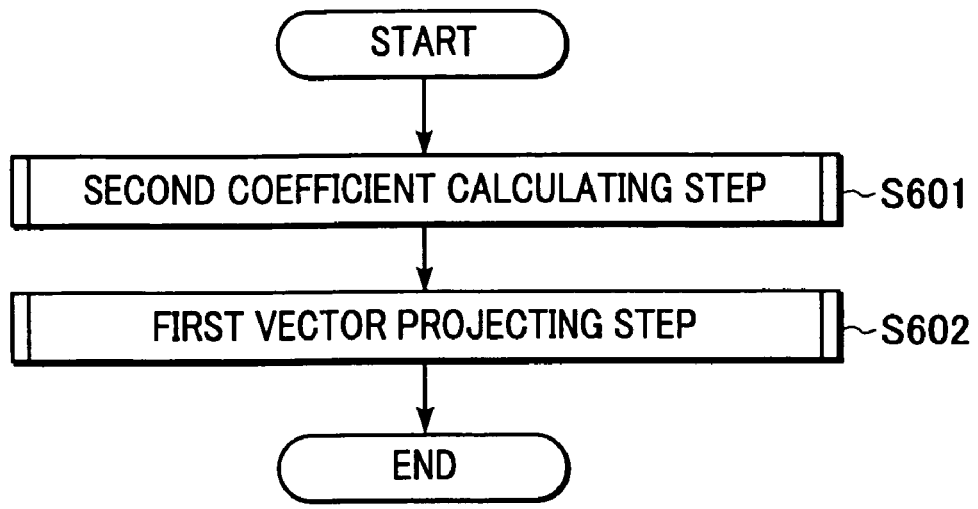
FIG. 6 is a flowchart showing a processing sequence of a first vector correcting step.

The first vector correcting step executed in each of step S104 and step S108 will be described below with reference to FIG. 6.

A second coefficient computing step is executed in step S601. In this step, values of a unit normal vector NN, a length DST of a vertical line from the origin to a hyperplane, and a coefficient B are computed. The second coefficient computing step will be described in detail later with reference to FIG. 8.

A first vector projecting step is executed in step S602. In this step, a vector X is corrected in accordance with an equation given below by using the unit normal vector NN, the length DST of the vertical line from the origin to the hyperplane, and the coefficient B, which have been computed in step S601:

$$\begin{aligned}X(j) &= X(j) - BNN(j), & \text{if } j \in \Lambda_1 \\ &= 0, & \text{otherwise}\end{aligned} \quad \text{(Eq. 33)}$$

The first vector correcting step is thereby brought to an end.

Figure 7:
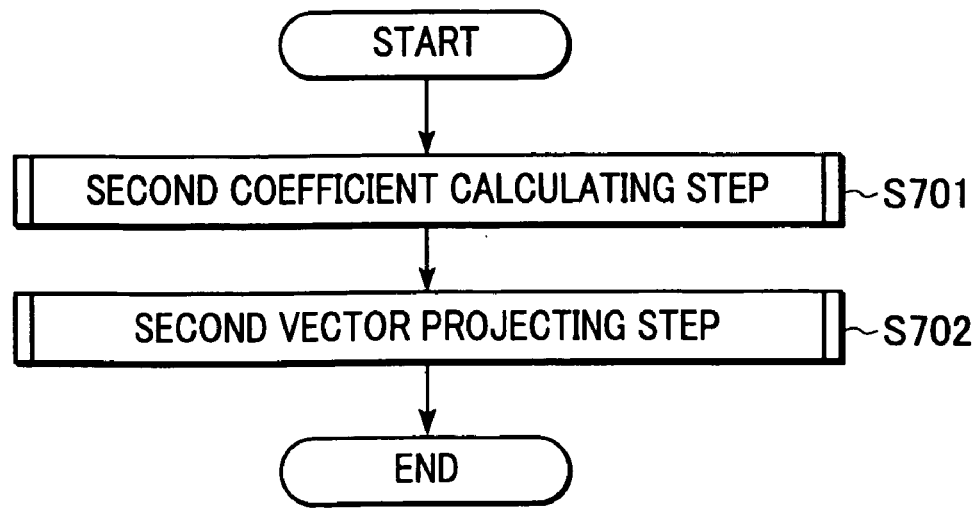
FIG. 7 is a flowchart showing a processing sequence of a second vector correcting step.

The second vector correcting step executed in step S111 will be described with reference to FIG. 7.

The second coefficient computing step is executed in step S701. This step will be described in detail later with reference to FIG. 8.

A second vector projecting step is executed in step S702. In this step, the vector X is corrected in accordance with an equation given below by using the unit normal vector NN, the length DST of the vertical line from the origin to the hyperplane, and the coefficient B, which have been computed in step S701:

$$\begin{aligned}X(j) &= X(j) - BNN(j), & \text{if } j \in \Lambda_1 \\ &= f_{j\max}, & \text{if } a^+ = 0 \\ &= f_{j\min}, & \text{if } a^- = 0\end{aligned} \quad \text{(Eq. 34)}$$

The second vector correcting step is thereby brought to an end.

Figure 8:
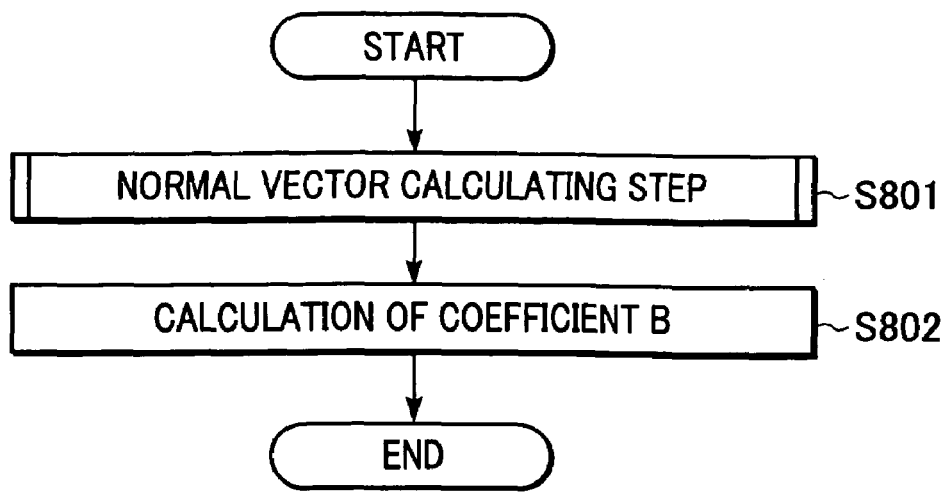
FIG. 8 is a flowchart showing a processing sequence of a coefficient B computing step.

The second coefficient computing step will be described below with reference to FIG. 8.

In step S801, a normal vector computing step is executed to obtain NN and DST. This step will be described in detail later with reference to FIG. 9.

In step S802, the coefficient B is computed using the following equation:

$$B = \sum_{k \in \Lambda_1} u(j)NN(j) - DST \quad \text{(Eq. 35)}$$

The second coefficient computing step is thereby brought to an end.

Figure 9:
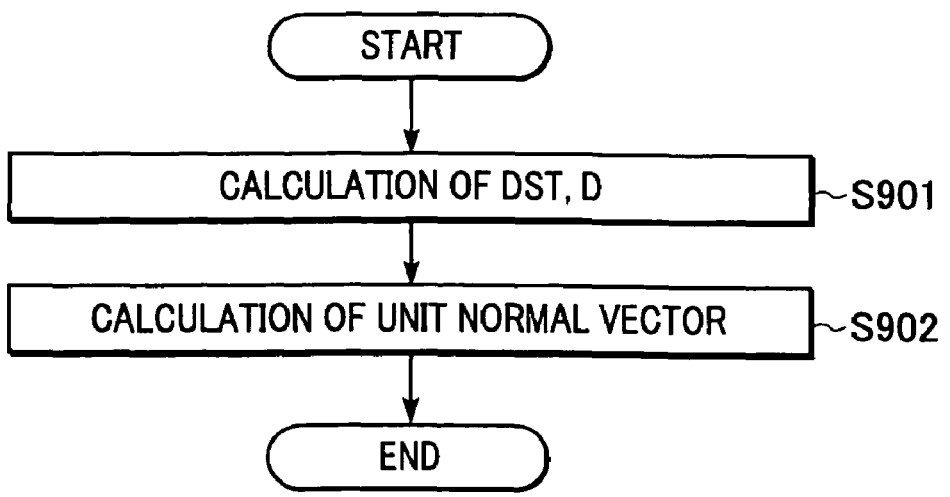
FIG. 9 is a flowchart showing a processing sequence of a normal vector computing step.

The normal vector computing step executed in step S801 will be described below with reference to FIG. 9. In this step, the unit normal vector NN and the length DST of the vertical line from the origin to the hyperplane are computed.

In step S901, the variables expressed by the following equations are computed;

$$DST = -c(0)' \quad \text{(Eq. 36)}$$

wherein c(0)' is calculated in accordance with an equation given below;

$$c(0)' = c(0) + \sum_{k \in \Lambda_2} c(k) f_t(k) \quad \text{(Eq. 37)}$$

$$D = \left(\sum_{k \in \Lambda_1} c(k)^2\right)^{-1/2} \quad \text{(Eq. 38)}$$

$$\sum_{j \in \Lambda_1} c(j) f_t(j) + c(0)' = 0 \quad \text{(Eq. 39)}$$

DST in Eq. 36 is corrected in accordance with an equation given below;

$$DST = DST/D \quad \text{(Eq. 40)}$$

DST given by above (Eq. 40) provides the length of the vertical line from the origin to the hyperplane.

In step S902, a normal vector computing step is executed. First, a normal vector N not normalized is computed in accordance with (Eq. 41) and (Eq. 42) given below:

$$N(j) = \prod_{k \in \Lambda_1} c(k)/c(j), \text{ if } j \in \Lambda_1 \quad \text{(Eq. 41)}$$

$$N(j) = f_t(j), \text{ otherwise} \quad \text{(Eq. 42)}$$

By using (Eq. 41), a unit normal vector NN for a partial space is computed in accordance with an equation given below;

$$NN(j) = N(j)\left(\sum_{j \in \Lambda_1} \prod_{k \in \Lambda_1} c(k)^2/c(i)^2\right)^{-1/2}, \text{ if } j \in \Lambda_1 \quad \text{(Eq. 43)}$$

For example, when the total sum of elements of the design variable vector is 1 as the equality restraint condition, components of the unit normal vector is simplified as follows because of $c(0)=-1$, $c(j)=1$, $j=1, 2, \ldots, n$;

$$NN(j) = |\Lambda_1|^{-1/2}, \text{ if } j \in \Lambda_1 \quad \text{(Eq. 44)}$$

wherein $|\Lambda_1|$ is the number of elements of $\Lambda_1$.

The normal vector computing step is thereby brought to an end.

The first solution determining step will be described below with reference to FIG. 10.

If a structure changes, there is a possibility that an element having a characteristic function value of 0 appears. In the case of carrying out a structural analysis for such a structure, a coefficient matrix becomes not regular and the problem cannot be solved by the direct method. For that reason, one of the following three methods is employed in the first solution determining step:

(1) The characteristic function value being 0 is replaced with a small value close to 0, and then simultaneous linear equations are solved by the direct method.
(2) Simultaneous linear equations are reconstructed using only the elements having values above 0, and then the direct method is employed to solve the problem.
(3) The problem is solved by an iterative method using a gradient vector, which does not require a computation of an inverse matrix. This iterative method includes a steepest descent method, a conjugate gradient method, etc.

The first solution determining step using the conjugate gradient method will be described below.

In step S1001, the CPU reads various factors of a system to be simulated. The various factors include an initial value of x, a value of the design parameter f, the boundary condition $B_1$, and the evaluation function $L_1$. Based on such information of the various factors, the program secures a required variable area in the primary storage 204 and sets values.

In step S1002, the number of times t of iterations is initialized to 1. The number of times t of iterations means the number of times at which a first iteration process has been executed in the first solution determining step. The first solution determining step is brought to an end if the number of times of iterations of the processing from step S1003 to step S1010 reaches a setting value.

In step S1003, the CPU computes a gradient vector $g_{1,t}$ of a first evaluation function for the state variable vector. The gradient vector $g_{1,t}$ is computed in accordance with the following equation:

$$g_{1,t} = (\partial L_1/\partial x_1, \partial L_1/\partial x_2, \ldots, \partial L_1/\partial x_n)^T \quad \text{(Eq. 45)}$$

Whether $\partial L_1/\partial x_j$ can be analytically solved or not depends on cases. If an analytical solution is present, (Eq. 45) is obtained by utilizing a computing process for the analytical solution. If otherwise, the gradient vector can be computed by utilizing the technique called automatic differentiation. The automatic differentiation technique is known from, for example, the above-cited Reference 6, etc.

In step S1004, the square of a norm of $g_{1,t}$ is computed, and if the computed value becomes 0 or a value very close to 0, the processing is brought to an end. The square of the norm is computed in accordance with the following equation;

$$\|g_{1,t}\|^2 = g_{1,t}^T g_{1,t} \quad \text{(Eq. 46)}$$

In step S1005, a coefficient β is computed in accordance with (Eq. 47) given below;

$$\beta = \|g_{1,t}\|^2/\|g_{1,t-1}\|^2 \quad \text{(Eq. 47)}$$

wherein β=1 holds at t=1.

In step S1006, a search direction vector $p_t$ is computed based on (Eq. 48) given below;

$$p_{1,t} = -g_{1,t-1} + \beta p_{1,t-1} \quad \text{(Eq. 48)}$$

In step S1007, a line searching step is executed. This step is to decide a coefficient a for updating the design variable. When the structural analysis problem is solved by using the finite element model, a value of α is given by the following equation:

$$\alpha = p_{1,t}^T g_{1,t}/(p_{1,t}^T A p_{1,t}) \quad \text{(Eq. 49)}$$

In step S108, the state variable vector is updated as follows:

$$x_{t+1} = x_t + \alpha p_{1,t} \quad \text{(Eq. 50)}$$

In step S1009, t is updated to t+1, and if t after the update exceeds the preset number of times of iterations, the processing is brought to an end.

The first solution determining step is thereby brought to an end.

PRACTICAL EXAMPLE

In this practical example, the present invention is applied to optimum shape automatic design for a cantilevered beam that is subjected to a weight at an arbitrary position. For the sake of simplicity, the following description is made on an assumption being limited to a problem of plane strain.

Figure 11:
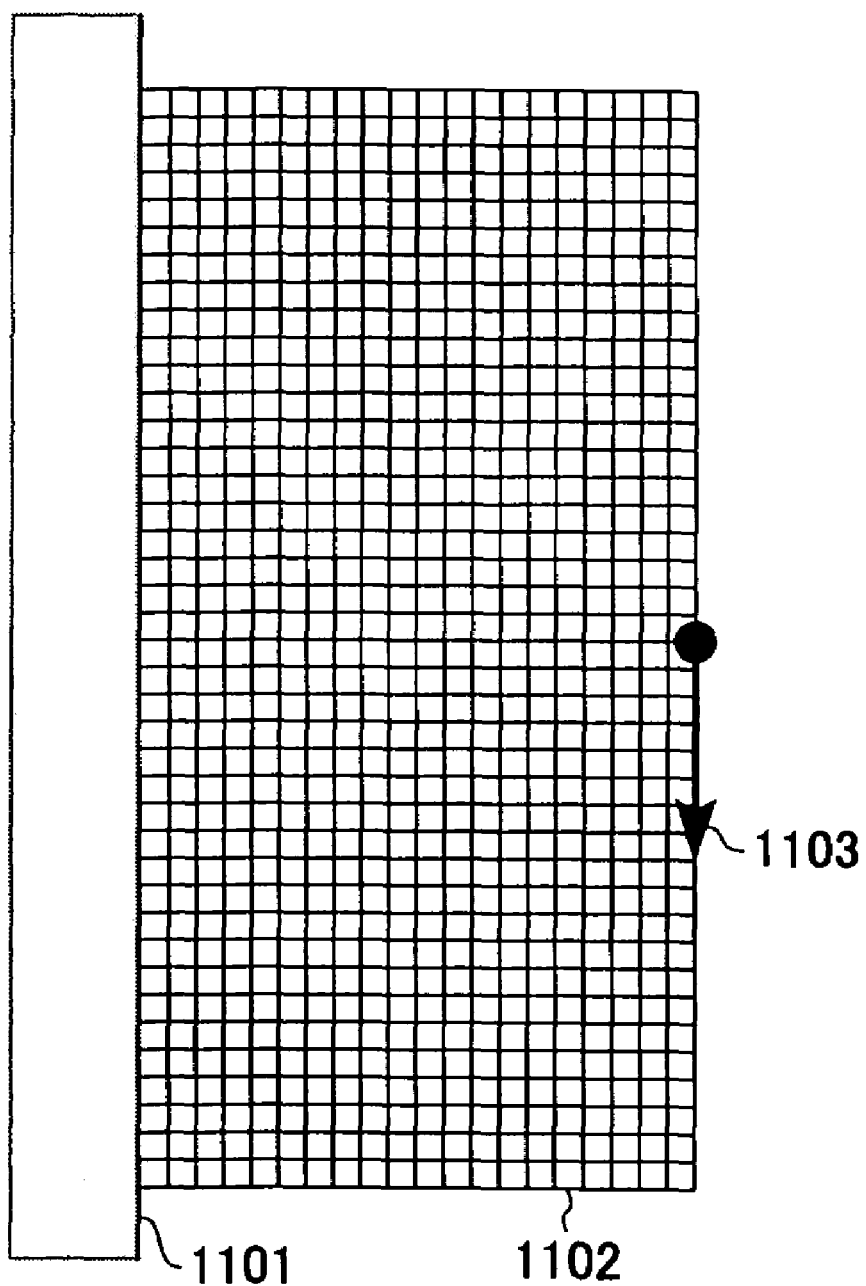
FIG. 11 is an illustration for explaining practical setting of a problem.

As shown in FIG. 11, a design area in which a structural member is able to exist is a rectangle 1102. According to the finite element method, the design area is divided at equal intervals into numbers $n_y$, $n_x$ of partial areas, respectively, in the vertical (length) and horizontal (width) directions. The divided partial areas are called cells and numbered such that a lower left cell and an upper right cell are expressed respectively by (1,1), ($n_y$,$n_x$). Lattices points are called nodes and likewise numbered such that a lower left node and an upper right node are expressed respectively by (1,1), ($n_y$+1,$n_x$+1).

In FIG. 11, numeral 1101 denotes a support member, and 1103 denotes a weight vector. Each cell (j,k) has a corresponding characteristic function value f(j,k). Here, the term "characteristic function value" means a variable taking a positive real number value in the range of 0 to 1, which represents the existence probability of the structural member in the cell (j,k), and it is an element of the design variable vector f, given below, in the present invention:

$$f=(f(1,1), f(1,2), \ldots, f(n_y,n_x))^T \quad \text{(Eq. 51)}$$

Similarly, each node (j,k) has a corresponding horizontal displacement u(j,k) and vertical displacement v(j,k). These displacements are real numbers taking arbitrary values and are elements of the state variable vector U, given below, in the present invention:

$$U=(u(1,1), v(1,1), u(1,2), v(1,2), \ldots, u(n_y+1,n_x+1), v(n_y+1,n_x+1))^T \quad \text{(Eq. 52)}$$

Assuming a rigidity matrix to be A and a weight vector to be b, as a well-known result based on the finite element method, the state variable vector U is given as a solution of the optimum problem of an evaluation generic function expressed by the following equation:

$$L_1=(\tfrac{1}{2})\, U^T A U - b^T U \quad \text{(Eq. 53)}$$

More specifically, it is known that the state variable vector U is given as a solution of a linear equation given below:

$$AU-b=0 \quad \text{(Eq. 54)}$$

Further, $g_{1,t}$ computed in the first solution determining step is given as the left side of (Eq. 54). Because (Eq. 54) is a set of simultaneous linear equations, it is usually solved by the direct method based on an inverse matrix. In the structure optimum problem, however, the rigidity matrix A is a function of the design variable vector f. Therefore, if f contains an element taking a value of 0, the rigidity matrix A is not fully filled with elements and becomes not regular. This results in that the simultaneous linear equations cannot be solved by the direct method. For that reason, the present invention employs the conjugate gradient method.

An evaluation function $L_2$ for the design variable vector f is defined by total strain energy as follows:

$$L_2=(\tfrac{1}{2})U^T A U \quad \text{(Eq. 55)}$$

Then, $g_t$ required in the second solution determining step can be computed in accordance with the following equation;

$$g_t=\partial L_2/\partial f(e)=-(\tfrac{1}{2})\, U_e^T A_e U_e \quad \text{(Eq. 56)}$$

wherein $U_e$, $A_e$ are respectively a displacement vector at a node corresponding to an element e and an element rigidity matrix corresponding to the displacement vector.

Figure 12:
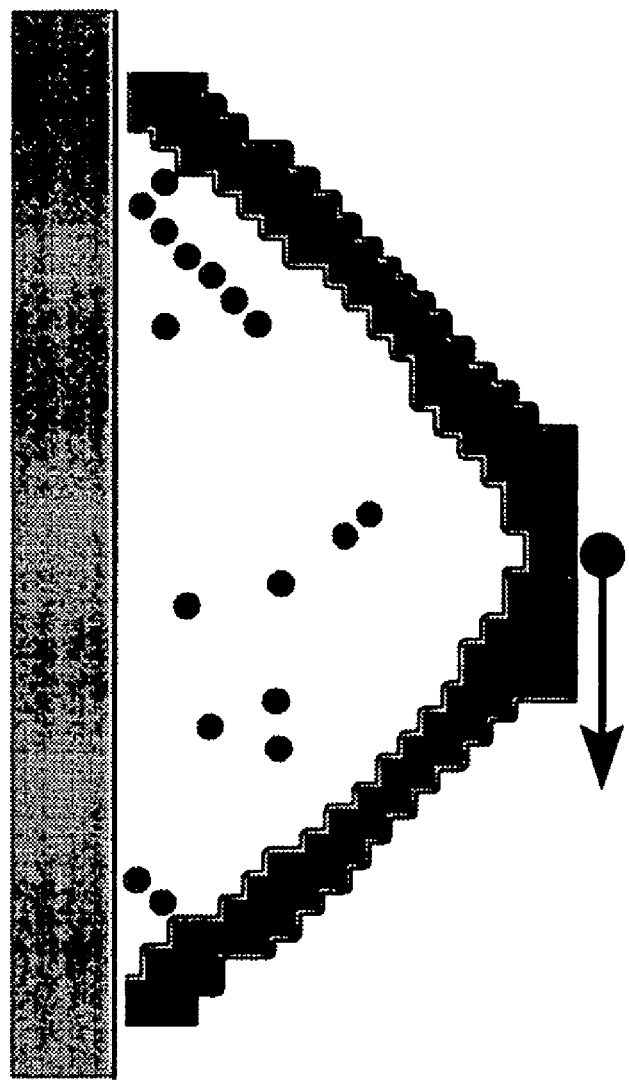
FIG. 12 is an illustration showing a calculation result in the embodiment.

FIG. 12 shows a computation result obtained in this example. In FIG. 12, a black area represents an area in which the structural member exists.

In this example, the aspect ratio of the design area for the structural member is 2:1 (length/width) and its analytical solution is, as known, a combined structure of beams arranged at ±45 degrees relative to the horizontal direction.

It is understood that the computation result shown in FIG. 12 is well matched with the known analytical solution.

Thus, according to the embodiment described above, the structure optimum design including topology can be executed without utilizing the experiential rules that depend on individual problems.

Figure 13:
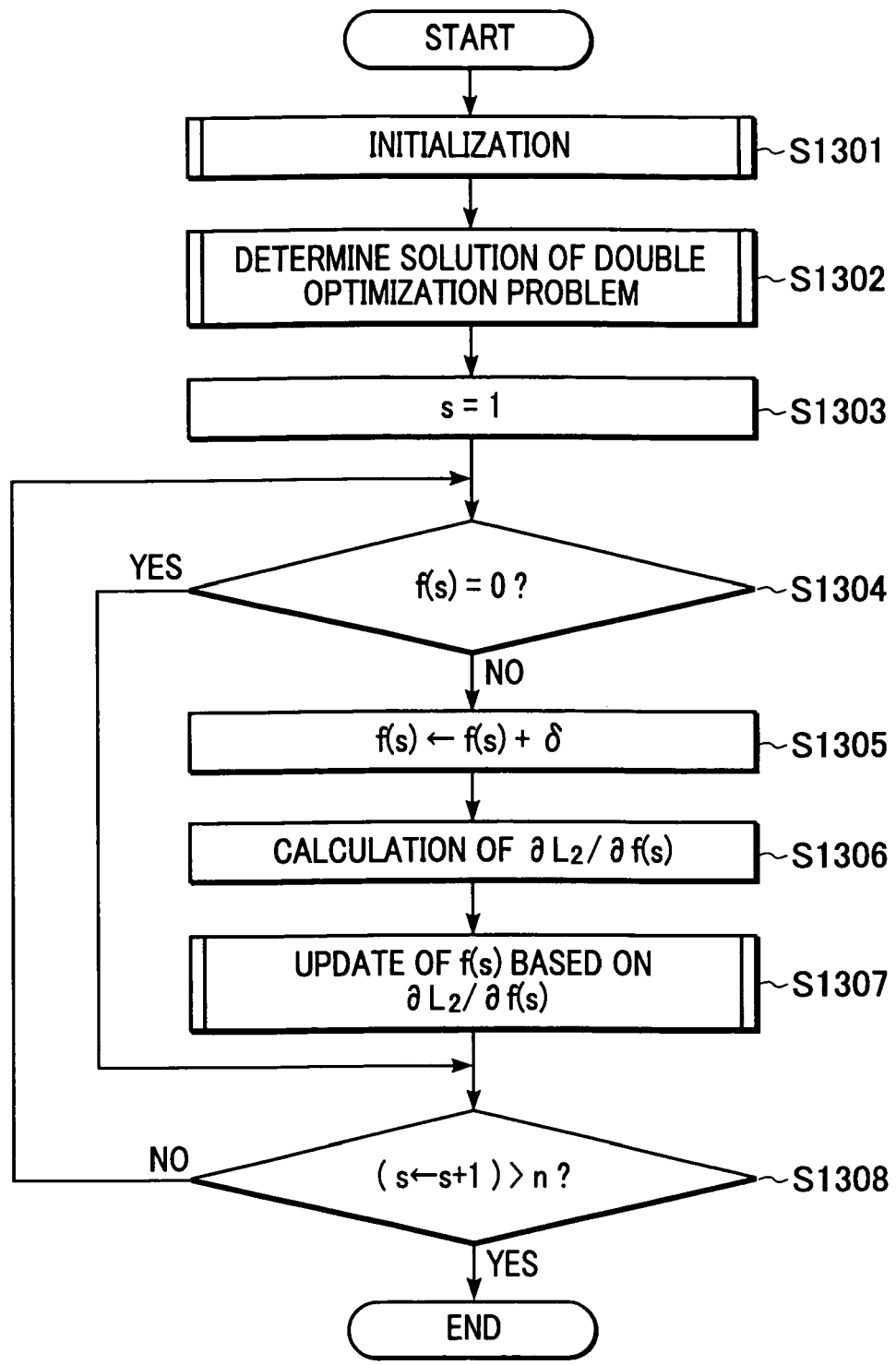
FIG. 13 is a flowchart showing a processing sequence for removing an undesired element.

An undesired element removing process will be described below. FIG. 13 is a flowchart showing a processing sequence for removing an undesired element. Referring to FIG. 13, in step S1301, the CPU reads various factors of a system to be simulated. The various factors may be read as data entered from the input unit 203 or the communication unit 206, or may be given by reading data that has been stored as a file in the secondary storage 205 beforehand. The various factors of the system include initial values of x and f, the boundary conditions $B_1$, $B_2$, the evaluation functions $L_1$, $L_2$, and the restraint conditions $Q_j$, $R_k$. Based on such information of the various factors, the program secures a required variable area in the primary storage 204 and sets values.

In step S1302, a solution of the optimization problem under the inequality restraint conditions formulated as (Eq. 4) to (Eq. 9) is determined. While the above-described method can be used in this solution determining step, the undesired element removing process described below is also applicable to the case of employing any of the following methods:

(1) sequential linear plan method
(2) feasible direction method
(3) gradient projection method
(4) general contraction gradient method
(5) optimum reference method Subsequent steps S1303 to S1308 constitute the undesired element removing process.

First, in step S1303, an element s is initialized to 1.

In step S1304, it is checked whether f(s) is 0. If so, the CPU proceeds to step S1308, and if otherwise, it proceeds to step S1305.

In step S1305, the value of f(s) is changed as follows:

$$f(s) \leftarrow f(s)+\delta \quad \text{(Eq. 57)}$$

wherein δ is an arbitrary real number other than 0, at which f(s) takes a value not smaller than 0, but not larger than 1.

In step S1306, sensitivity $\partial L_2/\partial f(s)$ of a second evaluation function for f(s) is computed as follows:

$$\partial L_2/\partial f=\partial/\partial f[(\tfrac{1}{2})U^T A U]$$

From a rigidity equation of AU=b, the following equation is obtained:

$$\partial L_2/\partial f=\partial/\partial f[(\tfrac{1}{2})b^T U]=(\tfrac{1}{2})b^T \partial U/\partial f \quad \text{(Eq. 58)}$$

On the other hand, assuming the weight b to be constant without depending on f, partial differentiation of both sides of the rigidity equation of AU=b by f leads to:

$$\partial U/\partial f=-A^{-1}\partial A/\partial f U \quad \text{(Eq. 59)}$$

because of $(\partial A/\partial f)U+A(\partial U/\partial f)=0$.

By putting (Eq. 59) in (Eq. 58), $$\partial L_2/\partial f=-(\tfrac{1}{2})U^T(\partial A/\partial f)U \quad \text{(Eq. 60)}$$

is obtained from the relation of $U=A^{-1}b$.

The above equation can be rewritten for a characteristic function of the element s as follows;

$$\partial L_2/\partial f(s)=-(\tfrac{1}{2})U_s^T(\partial A_s/\partial f(s))U_s \quad \text{(Eq. 61)}$$

wherein $U_s$ is a vector constituted by a displacement on the node belonging to the element s, and $A_s$ is an element rigidity matrix corresponding to $U_s$.

Whether $\partial A_s/\partial f(e)$ can be analytically solved or not depends on cases. If an analytical solution is present, a computing process for the analytical solution can be obtained. In the case of $A_s=f(s)A_s'$, for example, $\partial L_2/\partial f(s)$ is given by the following equation.

$$\partial L_2/\partial f(s) = -(\tfrac{1}{2})U_s^T A_s' U_s \qquad \text{(Eq. 62)}$$

If $\partial A/\partial f(s)$ cannot be analytically solved, it is possible to execute the computation by utilizing the above-mentioned technique called automatic differentiation.

Here, the sensitivity expressed by (Eq. 62) is given as 0 or a small value close to 0 for all the elements as a result of the solution determining step executed in step S1302.

A description will be made of whether the value of (Eq. 62) is changed or not when the characteristic function value $f(s)$ of the element s is changed in accordance with (Eq. 57).

First, when the element s contributes to the value of strain energy, i.e., when $(\tfrac{1}{2})U_s^T A_s U_s$ is not 0, $A_s$ changes with a change of $f(s)$, and therefore the strain energy $(\tfrac{1}{2})U_s^T A_s U_s$ of the element s also changes. Thus, $U_s$ obtained as the solution of the structural analysis problem takes different values $U_s'$ between before and after the change of $f(s)$. Accordingly, (Eq. 62) takes a negative value as follows:

$$\partial L_2/\partial f(s) = -(\tfrac{1}{2})U_s^T A_s' U_s' \ne -(\tfrac{1}{2})U_s^T A_s' U_s = 0 \qquad \text{(Eq. 63)}$$

On the other hand, when the element s does not contribute to the value of strain energy, i.e., when $(\tfrac{1}{2})U_s^T A_s U_s$ is 0, $U_s$ becomes 0 because of $A_s$ being a positive definite matrix, and therefore $(\tfrac{1}{2})U_s^T A_s U_s$ does not change even with a change of $f(s)$. Accordingly, $U_s$ obtained as the solution of the structural analysis problem takes the same value between before and after the change of $f(s)$, whereby (Eq. 62) becomes 0.

Stated another way, whether the relevant structural element is necessary or not can be determined by checking whether an absolute value of the sensitivity resulting upon a change in the value of $f(s)$ is 0 or a small value close to 0.

In step S1307, whether the sensitivity $\partial L_2/\partial f(s)$ is 0 is checked. If so, $f(s)$ is updated to 0, and if otherwise, $f(s)$ is not updated.

In step S1308, s is updated to s+1. Then, if updated s exceeds n, the processing is brought an end, and if otherwise, the CPU proceeds to step S1304.

Figure 14:
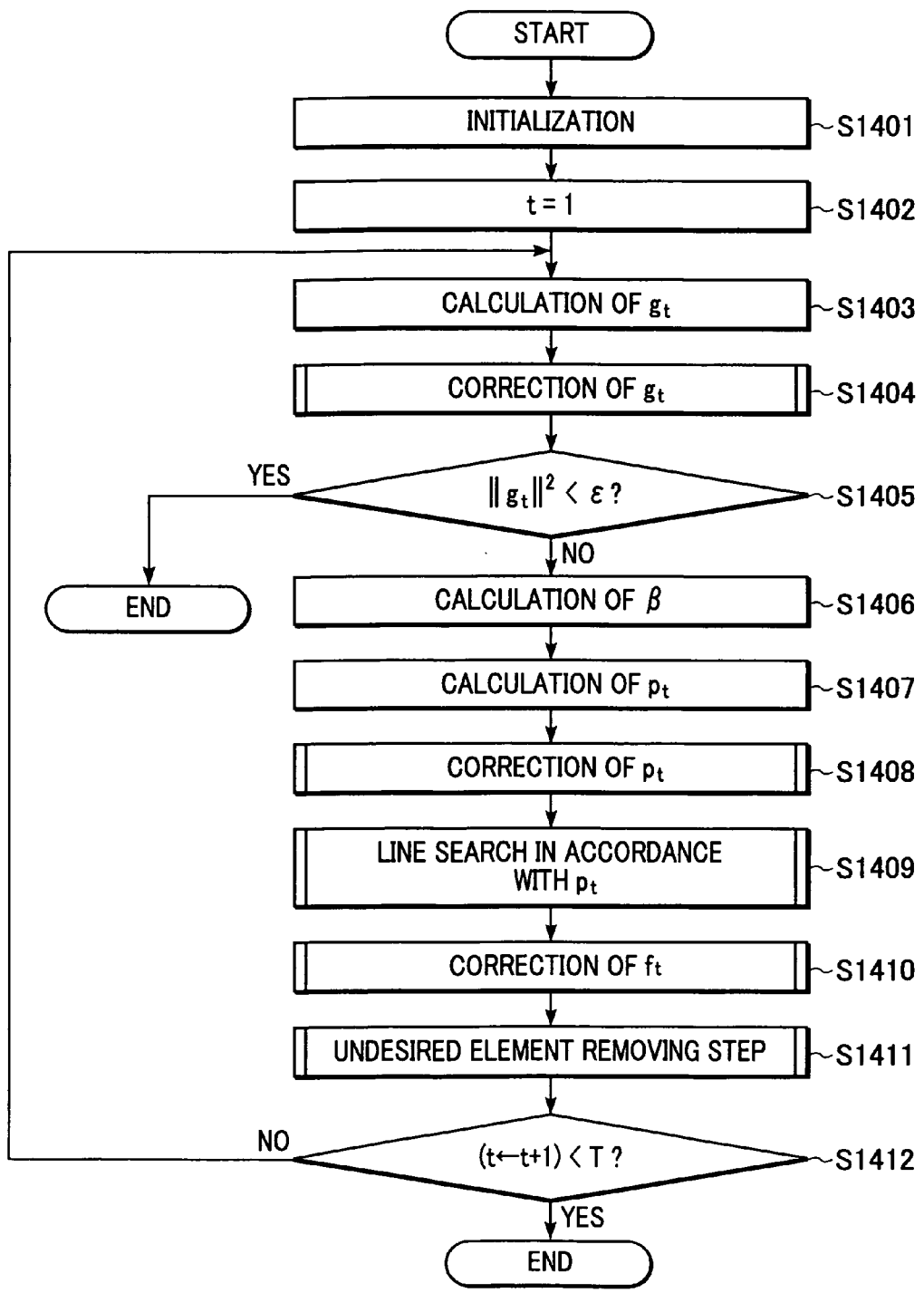
FIG. 14 is a flowchart showing another processing sequence for removing an undesired element.

In the method described above, the undesired element removing step is executed as a post-process. However, when the second solution determining step is executed as an iterative process, the undesired element removing step may be executed in the iteration loop. The processing in such a case will be described below with reference to FIG. 14. The conjugate gradient method is employed, by way for example, as the iterative process in the following description.

In step S1401, the CPU executes initialization. More specifically, the design variable vector f is set to a predetermined value, which written as $f_0$.

In step S1402, t is set to 1.

In step S1403, a value which the gradient vector $g_t$ of the second evaluation function for the design variable vector f takes at $f=f_0$ is computed as follows:

$$g_t \equiv \partial L_2/\partial f \qquad \text{(Eq. 64)}$$

-continued
$$= (\partial L_2/\partial f(1), \partial L_2/\partial f(2), \ldots, \partial L_2/\partial f(n))^T$$

In step S1404, $g_t$ is corrected so as to satisfy the equality restraint condition and the inequality restraint condition.

In step S1405, it is checked whether a norm computed in accordance with the following equation exceeds a preset value. If the norm exceeds the preset value, the processing is brought to an end, and if otherwise, the CPU proceeds to step S1406;

$$\|g_t\| = (g_t^T g_t)^{-1/2} \qquad \text{(Eq. 65)}$$

In step S1406, $\beta$ defined by an equation given below is computed:

$$\beta = \|g_t\|/\|g_{t-1}\| \qquad \text{(Eq. 66)}$$

wherein $\beta=0$ holds at $t=1$.

In step S1407, the search vector $p_t$ is computed in accordance with the following equation:

$$p_t = \beta p_t - g_t \qquad \text{(Eq. 67)}$$

In step S1408, $p_t$ is corrected so as to satisfy the equality restraint condition and the inequality restraint condition.

In step S1409, line search is executed along $p_t$ to find f that minimizes the second evaluation function. The found f is set as $f_t$.

In step S1410, $f_t$ is corrected so as to satisfy the equality restraint condition and the inequality restraint condition.

In step S1411, the undesired element removing step is executed.

In step S1412, t is updated to t+1, and if t after the update exceeds a preset value, the processing is brought to an end. If otherwise, the CPU proceeds to step S1403.

Additionally, the processing executed in steps S1404, S1408 and S1410 can be made by using a technique described as the gradient projection method in the above-cited Reference 4.

PRACTICAL EXAMPLE

In this practical example, the above-described embodiment is applied to optimum shape automatic design for a cantilevered beam that is subjected to a weight at an arbitrary position. For the sake of simplicity, the following description is made on an assumption being limited to a problem of plane strain.

The evaluation function $L_2$ for the design variable vector f is defined by total strain energy in accordance with (Eq. 55) mentioned above:

$$L_2 = (\tfrac{1}{2})U^T A U \qquad \text{(Eq. 55)}$$

Then, f minimizing (Eq. 55) is determined. This kind of problem is usually subjected to, as the equality restraint condition, a restriction on the total weight being constant, namely;

$$\sum_{j=1}^{j=n_y} \sum_{k=1}^{k=n_x} f(j,k) = \text{constant} \qquad \text{(Eq. 68)}$$

and to, as the inequality restraint condition, a restriction on the value range which the characteristic function value can take, namely:

$$0 \leq f(j,k) \leq 1 \quad \text{(Eq. 69)}$$

As described above, that optimization problem under the inequality restraint condition can be solved by the known solution determining method.

The undesired element removing step in this practical example will be described below.

In particular, the computation of sensitivity executed in step S1306 of FIG. 13 can be made by using the following equation;

$$\partial L_2/\partial f(j,k) = -(1/2) U_{j,k}^T A_{j,k} U_{j,k} \quad \text{(Eq. 70)}$$

wherein $U_{j,k}$ is an element displacement vector having, as a component, a displacement on the node belonging to the element (j,k), and $A_{j,k}$ is an element rigidity matrix corresponding to the element displacement vector.

Subsequently, a floating island element can be removed in accordance with the method described above with reference to FIG. 13.

Figure 15:
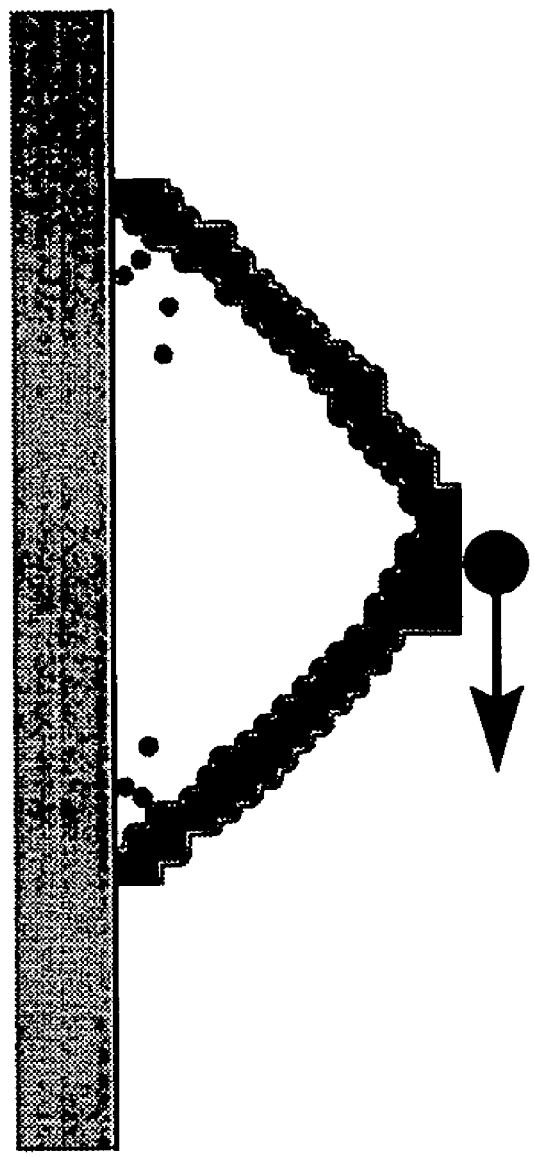
FIG. 15 is an illustration showing a calculation result after removing the undesired element.
Figure 16:
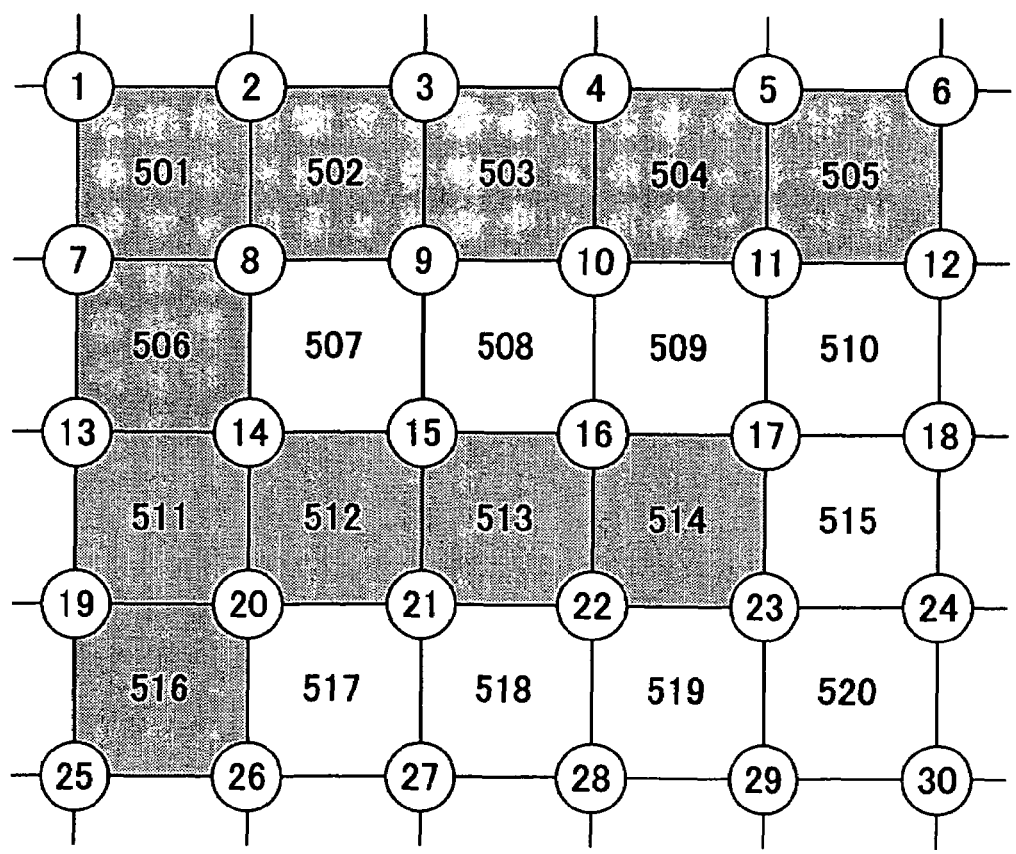
FIG. 16 is an illustration for explaining undesired elements.

FIG. 15 shows the shape of the structural member after the undesired element removing step has been executed on the shape of the structural member shown in FIG. 12. It can be confirmed that floating island areas and projections appearing in FIG. 12 are eliminated in FIG. 15. In this example, the undesired element is determined and removed only when the absolute value of the sensitivity is exactly equal to 0. A computing time required for the undesired element removing step is about 40 seconds when the CPU is Pentium III (933 MHz).

Incidentally, the present invention is applicable to not only an apparatus constituted by a single unit, but also to a system constituted by a plurality of units. Further, the present invention may be implemented by supplying, to an apparatus or a system, a storage medium storing program codes of software for realizing the functions of the above-described embodiment, and by causing a computer in the apparatus or the system to read and execute the program codes stored in the storage medium so that the apparatus or the system achieves the desired functions.

In addition to the case of directly realizing the functions of the above-described embodiment by the computer in the apparatus or the system executing the program codes stored in the storage medium, the present invention also involves the case of realizing the functions of the above-described embodiment by causing an OS (Operating System), etc. operating on the computer to execute the processing in accordance with instructions of the program codes.

In such a case, a storage medium storing the program codes constitutes the present invention.

Although the present invention has been described in its preferred form with a certain degree of particularity, many apparently widely different embodiments of the invention can be made without departing from the spirit and the scope thereof. It is to be understood that the invention is not limited to the specific embodiments thereof except as defined in the appended claims.

What is claimed is:

1. An optimum design method comprising:
  a first solution determining step of solving an optimization problem of a first evaluation function for a state variable vector with a design variable vector being as a parameter; and
  a second solution determining step of solving an optimization problem of a second evaluation function for the design variable vector and the state variable vector obtained in the first solution determining step,
  wherein the second solution determining step includes:
  a gradient vector computing step of computing a gradient vector of the second evaluation function for the design variable vector;
  a first coefficient computing step of computing a first coefficient based on a value of a norm of the gradient vector;
  a search vector computing step of computing a search vector based on the first coefficient;
  a second coefficient computing step of computing a second coefficient; and
  a design variable vector updating step of updating the design variable vector based on the second coefficient,
  the second coefficient computing step including the first solution determining step, the first solution determining step being executed as an iterative method based on the gradient vector, and the state variable vector being not initialized during iteration.

2. An optimum design method according to claim 1, wherein the line search step comprises:
  a maximum step size computing step of deciding a maximum step size in accordance with a restraint condition;
  a search range narrowing step of deciding a minimum point from a search range decided by the maximum step size; and
  a minimum point deciding step of deciding a minimum point in accordance with a comparison between a value of the second evaluation function at the minimum point and a value of the second evaluation function at an end point of the search range.

3. An optimum design method according to claim 1, wherein the second solution determining step includes an erasing step of erasing, from the design variable vector, a component corresponding to a structural element that does not contributes to the second evaluation function.

4. An optimum design method according to claim 1, wherein the erasing step erases a component for which a value of sensitivity of the second evaluation function for the design variable vector is always 0 when a value of each component of the design variable vector is increased and decreased.

5. An optimum design method according to claim 1, wherein the erasing step is executed on an element corresponding to a component for which a sensitivity vector computed in the second solution determining step is 0, the element providing existence probability of a structural element other than 0.

6. An optimum design method according to claim 1, wherein the erasing step is executed once per predetermined number of times of iteration processes in the second solution determining step.

7. An optimum design method according to claim 1, wherein the design variable vector is existence probability of a structural element in each element.

8. An optimum design method according to claim 1, further comprising a gradient vector correcting step of correcting the gradient vector computed in the gradient vector computing step in accordance with a restraint condition.

9. An optimum design method according to claim 1, further comprising a search vector correcting step of correcting the search vector computed in the search vector computing step in accordance with a restraint condition.

10. An optimum design method according to claim 1, further comprising a design variable vector correcting step of correcting the design variable vector computed in the design variable vector computing step in accordance with a restraint condition.

11. An optimum design method according to claim 1, further comprising a convergence determining step of determining based on the value of the norm of the gradient vector whether the second solution determining step is brought to an end.

12. An optimum design apparatus comprising:
   first solution determining means for solving an optimization problem of a first evaluation function for a state variable vector with a design variable vector being as a parameter; and
   second solution determining means for solving an optimization problem of a second evaluation function for the design variable vector and the state variable vector obtained in the first solution determining means,
   wherein the second solution determining means includes:
   gradient vector computing means for computing a gradient vector of the second evaluation function for the design variable vector;
   first coefficient computing means for computing a first coefficient based on a value of a norm of the gradient vector;
   search vector computing means for computing a search vector based on the first coefficient;
   second coefficient computing means for computing a second coefficient; and
   design variable vector updating means for updating the design variable vector based on the second coefficient,
   the second coefficient computing means including the first solution determining means, the first solution determining means being executed as an iterative method based on the gradient vector, and the state variable vector being not initialized during iteration.

13. A computer-readable optimum design program, the program comprising codes for causing a computer to perform an optimum design method comprising:
   a first solution determining step of solving an optimization problem of a first evaluation function for a state variable vector with a design variable vector being as a parameter; and
   a second solution determining step of solving an optimization problem of a second evaluation function for the design variable vector and the state variable vector obtained in the first solution determining step,
   wherein the second solution determining step includes:
   a gradient vector computing step of computing a gradient vector of the second evaluation function for the design variable vector;
   a first coefficient computing step of computing a first coefficient based on a value of a norm of the gradient vector;
   a search vector computing step of computing a search vector based on the first coefficient;
   a second coefficient computing step of computing a second coefficient; and
   a design variable vector updating step of updating the design variable vector based on the second coefficient,
   the second coefficient computing step including the first solution determining step, the first solution determining step being executed as an iterative method based on the gradient vector, and the state variable vector being not initialized during iteration.

* * * * *